(12) United States Patent
Keyzer et al.

(10) Patent No.: US 11,817,558 B2
(45) Date of Patent: *Nov. 14, 2023

(54) MAGNESIUM SALTS

(71) Applicant: Dyson Technology Limited, Wiltshire (GB)

(72) Inventors: Evan Keyzer, Cambridge (GB); Jeongjae Lee, Seoul (KR); Clare Grey, Cambridge (GB); Dominic Wright, Newmarket (GB)

(73) Assignee: Dyson Technology Limited, Wiltshire (GB)

( * ) Notice: Subject to any disclaimer, the term of this patent is extended or adjusted under 35 U.S.C. 154(b) by 259 days.

This patent is subject to a terminal disclaimer.

(21) Appl. No.: 16/647,473

(22) PCT Filed: Sep. 7, 2018

(86) PCT No.: PCT/GB2018/052538
§ 371 (c)(1),
(2) Date: Mar. 13, 2020

(87) PCT Pub. No.: WO2019/053401
PCT Pub. Date: Mar. 21, 2019

(65) Prior Publication Data
US 2020/0280099 A1    Sep. 3, 2020

(30) Foreign Application Priority Data

Sep. 14, 2017    (GB) ...................................... 1714771

(51) Int. Cl.
*H01M 10/0568*    (2010.01)
*C01B 6/24*    (2006.01)
(Continued)

(52) U.S. Cl.
CPC ......... *H01M 10/0568* (2013.01); *C01B 6/243* (2013.01); *C01B 25/10* (2013.01);
(Continued)

(58) Field of Classification Search
None
See application file for complete search history.

(56) References Cited

U.S. PATENT DOCUMENTS

| | | |
|---|---|---|
| 3,761,500 A | 9/1973 | Thomas |
| 3,993,508 A | 11/1976 | Erlichman |

(Continued)

FOREIGN PATENT DOCUMENTS

| | | |
|---|---|---|
| CA | 2527207 A1 | 12/2004 |
| CN | 1404635 A | 3/2003 |

(Continued)

OTHER PUBLICATIONS

Peretich, A.L., Amenta, D.S., Gilje, J.W. et al. "Crystal Structure of [Me2NCH(O)]2Mg[(μ-OPri)2Al(OPri)2]2". J Chem Crystallogr 40, 716-719 (2010). https://doi.org/10.1007/s10870-010-9783-x.*

(Continued)

*Primary Examiner* — Laura Weiner
(74) *Attorney, Agent, or Firm* — Faegre Drinker Biddle & Reath LLP

(57) ABSTRACT

A salt of the formula: $Mg[Al(R)_4]_2$, where R represents a halogen-free compound selected from a deprotonated alcohol or thiol; or an amine; or a mixture thereof.

7 Claims, 6 Drawing Sheets

(51) Int. Cl.
  *C01B 25/10* (2006.01)
  *C07F 5/06* (2006.01)
  *H01M 10/054* (2010.01)
  *H01M 10/0567* (2010.01)

(52) U.S. Cl.
  CPC ............ *C07F 5/069* (2013.01); *H01M 10/054* (2013.01); *H01M 10/0567* (2013.01); *C01P 2006/40* (2013.01); *H01M 2300/0025* (2013.01)

(56) References Cited

U.S. PATENT DOCUMENTS

| | | | |
|---|---|---|---|
| 4,047,289 A | 9/1977 | Wolff | |
| 4,288,381 A | 9/1981 | Dozzi et al. | |
| 4,299,986 A * | 11/1981 | Cucinella | C07C 1/26 568/8 |
| 5,136,046 A | 8/1992 | Park et al. | |
| 5,250,784 A | 10/1993 | Muller et al. | |
| 5,411,592 A | 5/1995 | Ovshinsky et al. | |
| 5,670,652 A * | 9/1997 | Drauz | C07D 263/22 548/228 |
| 5,718,989 A | 2/1998 | Aoki et al. | |
| 6,616,714 B1 | 9/2003 | Gauthier et al. | |
| 7,754,384 B2 | 7/2010 | Patoux et al. | |
| 8,122,250 B2 | 2/2012 | Haverinen | |
| 8,153,301 B2 | 4/2012 | Jiang | |
| 8,546,018 B2 | 10/2013 | Kajiyama | |
| 8,722,250 B2 | 5/2014 | Park | |
| 9,293,766 B2 | 3/2016 | Liu et al. | |
| 9,325,030 B2 | 4/2016 | Zidan | |
| 9,525,173 B2 | 12/2016 | Kagei et al. | |
| 9,575,025 B2 | 2/2017 | Nakayama et al. | |
| 9,593,024 B2 | 3/2017 | Thackeray et al. | |
| 9,692,084 B2 | 6/2017 | Yang et al. | |
| 9,755,272 B2 | 9/2017 | Gaben | |
| 9,768,450 B2 | 9/2017 | Song et al. | |
| 9,843,041 B2 | 12/2017 | Lopez | |
| 9,893,376 B2 | 2/2018 | Yang et al. | |
| 9,947,916 B2 | 4/2018 | Oda | |
| 9,960,458 B2 | 5/2018 | Weicker et al. | |
| 9,997,774 B2 | 6/2018 | Hiratsuka | |
| 10,199,649 B2 | 2/2019 | Beck et al. | |
| 10,290,869 B2 | 5/2019 | Axelbaum | |
| 10,629,902 B2 | 4/2020 | Yu | |
| 2002/0110733 A1 | 8/2002 | Johnson | |
| 2003/0022063 A1 | 1/2003 | Paulsen et al. | |
| 2003/0129495 A1 | 7/2003 | Yamato et al. | |
| 2003/0162086 A1 | 8/2003 | Longhi, Jr. et al. | |
| 2004/0091779 A1 | 5/2004 | Kang et al. | |
| 2005/0014065 A1 | 1/2005 | Jung et al. | |
| 2005/0112466 A1 | 5/2005 | Jordy et al. | |
| 2006/0160261 A1 | 7/2006 | Sheats | |
| 2007/0238019 A1 | 10/2007 | Laurent et al. | |
| 2008/0263855 A1 | 10/2008 | Li et al. | |
| 2008/0264478 A1 | 10/2008 | Ahn et al. | |
| 2009/0148764 A1 | 6/2009 | Kwak et al. | |
| 2010/0108939 A1 | 5/2010 | Breger et al. | |
| 2010/0233542 A1 | 9/2010 | Endo et al. | |
| 2010/0248033 A1 | 9/2010 | Kumar et al. | |
| 2011/0126402 A1 | 6/2011 | Kwak et al. | |
| 2011/0129594 A1 | 6/2011 | Kwak et al. | |
| 2011/0168944 A1 | 7/2011 | Chang et al. | |
| 2011/0291043 A1 | 12/2011 | Wilcox et al. | |
| 2011/0294015 A1 | 12/2011 | Pirk et al. | |
| 2011/0311883 A1 | 12/2011 | Oukassi et al. | |
| 2012/0183855 A1 | 7/2012 | Wohlfahrt-Mehrens et al. | |
| 2012/0225199 A1 | 9/2012 | Muthu et al. | |
| 2012/0270114 A1 | 10/2012 | Reynolds et al. | |
| 2012/0312474 A1 | 12/2012 | Kwak et al. | |
| 2012/0321815 A1 | 12/2012 | Song et al. | |
| 2013/0040201 A1 | 2/2013 | Manthiram | |
| 2013/0160283 A1 | 6/2013 | Wu | |
| 2013/0260248 A1 | 10/2013 | Seki et al. | |
| 2013/0298387 A1 | 11/2013 | Kobier et al. | |
| 2014/0000100 A1 | 1/2014 | Oh et al. | |
| 2014/0007418 A1 | 1/2014 | Song et al. | |
| 2014/0120397 A1 | 5/2014 | Kim et al. | |
| 2014/0154555 A1 | 6/2014 | Endoh et al. | |
| 2014/0154581 A1 | 6/2014 | Kawasato et al. | |
| 2014/0178748 A1 | 6/2014 | Chernyshov et al. | |
| 2014/0227594 A1 | 8/2014 | Song et al. | |
| 2014/0227609 A1 | 8/2014 | Frey et al. | |
| 2014/0242463 A1 | 8/2014 | Song | |
| 2014/0255603 A1 | 9/2014 | Xiao et al. | |
| 2015/0010822 A1 | 1/2015 | Nakahara et al. | |
| 2015/0010872 A1 | 1/2015 | Schindler et al. | |
| 2015/0050522 A1 | 2/2015 | Manthiram et al. | |
| 2015/0064558 A1 | 3/2015 | Seki et al. | |
| 2015/0102530 A1 | 4/2015 | Wallace et al. | |
| 2015/0180031 A1 | 6/2015 | Thackeray et al. | |
| 2015/0188186 A1 | 7/2015 | Bedjaoui et al. | |
| 2015/0280201 A1 | 10/2015 | Bhardwaj | |
| 2016/0164088 A1 | 6/2016 | Peralta et al. | |
| 2016/0164092 A1 | 6/2016 | Stottlemyer | |
| 2016/0218362 A1 | 7/2016 | Kagei et al. | |
| 2016/0218364 A1 | 7/2016 | Sakai et al. | |
| 2016/0254539 A1 | 9/2016 | Kagei et al. | |
| 2016/0294010 A1* | 10/2016 | Herb | H01M 10/0569 |
| 2016/0372783 A1 | 12/2016 | Min et al. | |
| 2017/0133678 A1 | 5/2017 | Ozoemena et al. | |
| 2019/0044182 A1 | 2/2019 | Maeda et al. | |
| 2019/0115627 A1 | 4/2019 | Rendall | |
| 2019/0334171 A1 | 10/2019 | Ozoemena | |
| 2020/0220221 A1 | 7/2020 | Keyzer et al. | |
| 2020/0335786 A1 | 10/2020 | Roberts et al. | |
| 2020/0377376 A1 | 12/2020 | Roberts et al. | |
| 2020/0381718 A1 | 12/2020 | Roberts et al. | |
| 2020/0381724 A1 | 12/2020 | Roberts et al. | |
| 2020/0381725 A1 | 12/2020 | Roberts et al. | |
| 2020/0381726 A1 | 12/2020 | Roberts et al. | |

FOREIGN PATENT DOCUMENTS

| | | |
|---|---|---|
| CN | 1458706 A | 11/2003 |
| CN | 1464573 A | 12/2003 |
| CN | 1610154 A | 4/2005 |
| CN | 101128941 A | 2/2008 |
| CN | 101562245 A | 10/2009 |
| CN | 101694876 A | 4/2010 |
| CN | 101855770 A | 10/2010 |
| CN | 102054986 A | 5/2011 |
| CN | 102074700 A | 5/2011 |
| CN | 102881873 A | 1/2013 |
| CN | 103035900 A | 4/2013 |
| CN | 103066274 A | 4/2013 |
| CN | 103311513 A | 9/2013 |
| CN | 103545519 A | 1/2014 |
| CN | 103887562 A | 6/2014 |
| CN | 105047898 A | 11/2015 |
| CN | 105742607 A | 7/2016 |
| CN | 105810934 A | 7/2016 |
| CN | 103943844 B | 8/2016 |
| CN | 106410186 A | 2/2017 |
| CN | 106573795 A | 4/2017 |
| CN | 104241633 B | 9/2017 |
| DE | 4227720 A1 | 4/1993 |
| EP | 1189296 A2 | 3/2002 |
| EP | 2746288 A1 | 6/2014 |
| EP | 2763219 A2 | 8/2014 |
| EP | 2827430 A1 | 1/2015 |
| EP | 3093272 A1 | 11/2016 |
| GB | 1402544 A | 8/1975 |
| GB | 2128604 A | 5/1984 |
| JP | 45-035555 | 11/1970 |
| JP | 57-96472 A | 6/1982 |
| JP | S64-21870 A | 1/1989 |
| JP | H4-269721 A | 9/1992 |
| JP | 09-237631 A | 9/1997 |
| JP | 2000-149911 A | 5/2000 |
| JP | 2002-343342 A | 11/2002 |
| JP | 2003-226955 A | 8/2003 |
| JP | 2005-044801 A | 2/2005 |
| JP | 2005-100947 A | 4/2005 |

(56) References Cited

FOREIGN PATENT DOCUMENTS

| | | | |
|---|---|---|---|
| JP | 2005-150093 A | 6/2005 |
| JP | 2005-150102 A | 6/2005 |
| JP | 2006-294597 A | 10/2006 |
| JP | 2007-503102 A | 2/2007 |
| JP | 2009-182273 A | 8/2009 |
| JP | 2009-246236 A | 10/2009 |
| JP | 2009-544141 A | 12/2009 |
| JP | 2010-251075 A | 11/2010 |
| JP | 2011-108603 A | 6/2011 |
| JP | 2012-129166 A | 7/2012 |
| JP | 2013-506945 A | 2/2013 |
| JP | 2014-510372 A | 4/2014 |
| JP | 2014-112476 A | 6/2014 |
| JP | 2014-146458 A | 8/2014 |
| JP | 2014-529176 A | 10/2014 |
| JP | 2014-531718 A | 11/2014 |
| JP | 2014-531719 A | 11/2014 |
| JP | 2017-521848 A | 8/2017 |
| KR | 10-2004-0096063 A | 11/2004 |
| KR | 10-2014-0081468 A | 7/2014 |
| KR | 10-2016-0091172 A | 8/2016 |
| KR | 10-2017-0008540 A | 1/2017 |
| KR | 10-2017-0025874 A | 3/2017 |
| TW | 201145648 A | 12/2011 |
| WO | 2006/027925 A2 | 3/2006 |
| WO | 2006/071972 A2 | 7/2006 |
| WO | 2009/055529 A1 | 4/2009 |
| WO | 2010/036723 A1 | 4/2010 |
| WO | 2011/039132 A1 | 4/2011 |
| WO | 2011/052607 A1 | 5/2011 |
| WO | 2012/065767 A1 | 5/2012 |
| WO | 2013/021955 A1 | 2/2013 |
| WO | 2013/035519 A1 | 3/2013 |
| WO | 2013/118659 A1 | 8/2013 |
| WO | 2013/146723 A1 | 10/2013 |
| WO | 2015/007586 A1 | 1/2015 |
| WO | 2015/053357 A1 | 4/2015 |
| WO | 2015/107194 A1 | 7/2015 |
| WO | 2016/001884 A1 | 1/2016 |
| WO | 2016/210419 A1 | 12/2016 |
| WO | 2017/047280 A1 | 3/2017 |
| WO | 2017/087403 A1 | 5/2017 |

OTHER PUBLICATIONS

Meese-Marktscheffel, Juliane. "Magnesium-Aluminum Alkoxides: The Synthesis of Mg[Al(OR)4]2 (R = Busec and Ph), Structure of (thf)2Mg[(.mu.-OPh)2Al(OPh)2]2, and Dynamic NMR of Mg[Al(OBusec)4]2." Polyhedron 13.6-7 (1994): 1045-1050. Web.*
Meese-Marktscheffel et al., "Magnesium-aluminum alkoxides: the synthesis of Mg[Al(OR)4]2 (R=Busec and Ph), structure of (thf)2Mg[(μ-OPh)2Al (OPh))2]2, and dynamic NMR of Mg[Al(OBusec)4]2", Polyhedron, 1994, vol. 13, No. 6-7, pp. 1045-1050.
Office Action received for Japanese Application No. 2020-515116, dated Oct. 12, 2021, 4 pages (2 pages of English Translation and 2 pages of Original Document).
Office Action received for Japanese Patent Application No. 2020-552157, dated Jun. 21, 2021, 10 pages (5 pages of English Translation and 5 pages of Original Document).
Office Action received for Japanese Patent Application No. 2020-552160, dated Jul. 5, 2021, 5 pages (2 pages of English Translation and 3 pages of Original Document).
Office Action received for Japanese Patent Application No. 2020552156 dated Sep. 7, 2021, 12 pages (6 pages of English Translation and 6 pages of Original Document).
Birrozzi et al. (2016). "Beneficial effect of propane sultone and tris(trimethylsilyl) borate as electrolyte additives on the cycling stability of the lithium rich nickel manganese cobalt (NMC) oxide," Journal of Power Sources 325:525-533.
Cucinella et al. (1982). "Calcium Alkoxyalanates I. Synthesis and Physicochemical Characterization," Journal of Organometallic Chemistry 224(1): 1-12.

Hudson et al. (2007). "Studies on Synthesis and Dehydrogenation Behavior of Magnesium Alanate and Magnesium-Sodium Alanate Mixture," International Journal of Hydrogen Energy 32(18): 4933-4938.
International Search Report and Written Opinion dated Oct. 29, 2018, directed to International Application No. PCT/GB2018/052538; 15 pages.
Lu et al. (Apr. 2002). "Synthesis, Structure, and Electrochemical Behavior of Li[NixLi(1/3-2x/3)Mn(2/3-x/3)]O2," Journal of the Electrochemical Society, 149(6): A778-A791.
Mehrotra et al. (Jan. 1978). "Preparation and Characterization of Some Volatile Double Isopropoxides of Aluminium with Alkaline Earth Metals," Inorganica Chemica Acta 29:131-136.
Metz et al. (2002). "Weakly Coordinating Al-, Nb-, Ta-, Y-, and La-Based Perfluoroaryloxymetalate Anions as Cocatalyst Components for Single-Site Olefin Polymerization," Organometallics 21(18): 3691-3702.
Park et al. (Apr. 2004). "Structural investigation and electrochemical behaviour of Li[NixLi(1/3-2x/3)Mn(2/3-x/3)]O2 compounds by a simple combustion method," Journal of Power Sources 129: 288-295.
Park et al. (May 2010). "Suppression of O2 evolution from oxide cathode for lithium-ion batteries: VOx-impregnated 0.5Li2MnO3—0.5LiNi0.4Co0.2Mn0.4O2 cathode," Chemical Communications, 46(23): 4190-4192.
Search Report dated May 30, 2018, directed to GB Application No. 1714771.1; 2 pages.
Thackeray et al. (Aug. 2006). "Comments on the structural complexity of lithium-rich Li1+xM1-xO2 electrodes (M+Mn, Ni, Co) for lithium batteries," Electrochemistry Communications 8(9):1531-1538.
Turova et al. (1977). "Hydrolysis and Alcoholysis of Alkali Metal Aluminium Hydrides," Inorganica Chimica Acta, 21: 157-161.
Wu et al. (Mar. 2006). "High Capacity, Surface-Modified Layered Li[Li(1-x)/3Mn(2-x)/3Nix/3Cox/3]O2 Cathodes with Low Irreversible Capacity Loss," Electrochemical and Solid-State Letters 9(5): A221-A224.
Yasushi et al. (Nov. 16, 1984) "CAS No. 32843-22-4] Aluminate(1-), tetrakis(diphenylaminato)-, magnesium," (2 pages).
Govil et al., "Some Double Ethoxides of Alkaline Earth Metals with Aluminium", Synthesis and Reactivity in Inorganic and Metal-Organic Chemistry, vol. 5, No. 4, 1975, pp. 267-277.
International Preliminary Report on Patentability received for PCT Patent Application No. PCT/GB2018/052537, dated Mar. 26, 2020, 13 pages.
International Preliminary Report on Patentability received for PCT Patent Application No. PCT/GB2018/052538, dated Mar. 26, 2020, 8 pages.
International Preliminary Report on Patentability received for PCT Patent Application No. PCT/GB2018/053655, dated Jul. 2, 2020, 10 pages.
International Preliminary Report on Patentability received for PCT Patent Application No. PCT/GB2018/053656, dated Jul. 2, 2020, 8 pages.
International Preliminary Report on Patentability received for PCT Patent Application No. PCT/GB2018/053657, dated Jul. 2, 2020, 10 pages.
International Preliminary Report on Patentability received for PCT Patent Application No. PCT/GB2018/053659, dated Jul. 2, 2020, 11 pages.
International Preliminary Report on Patentability received for PCT Patent Application No. PCT/GB2018/053660, dated Jul. 2, 2020, 7 pages.
International Preliminary Report on Patentability received for PCT Patent Application No. PCT/GB2018/053663, dated Jul. 2, 2020, 7 pages.
International Search Report and Written Opinion received for PCT Patent Application No. PCT/GB2018/052537, dated Dec. 19, 2018, 17 pages.
International Search Report and Written Opinion received for PCT Patent Application No. PCT/GB2018/053655, dated Apr. 8, 2019, 15 pages.

(56) References Cited

OTHER PUBLICATIONS

International Search Report and Written Opinion received for PCT Patent Application No. PCT/GB2018/053656, dated Feb. 15, 2019, 11 pages.
International Search Report and Written Opinion received for PCT Patent Application No. PCT/GB2018/053657, dated Apr. 15, 2019, 14 pages.
International Search Report and Written Opinion received for PCT Patent Application No. PCT/GB2018/053659, dated Apr. 8, 2019, 16 pages.
International Search Report and Written Opinion received for PCT Patent Application No. PCT/GB2018/053660, dated Feb. 14, 2019, 9 pages.
International Search Report and Written Opinion received for PCT Patent Application No. PCT/GB2018/053663, dated Sep. 15, 2019, 10 pages.
Office Action received for Korean Patent Application No. 10-2020-7010108, dated Jul. 28, 2021, 10 pages (5 pages of English Translation and 5 pages of Original Document).
Office Action received for Korean Patent Application No. 10-2020-7010109, dated Jul. 28, 2021, 10 pages (5 pages of English Translation and 5 pages of Original Document).
Search Report dated Jun. 28, 2018, directed to GB Application 1721179.8; 2 pages.
Search Report dated Jun. 28, 2018, directed to GB Application No. 1721177.2; 2 pages.
Search Report dated Jun. 28, 2018, directed to GB Application No. 1721178.0; 2 pages.
Search Report dated Jun. 28, 2018, directed to GB Application No. 1721180.6; 2 pages.
Search Report dated May 30, 2018, directed to GB Application No. 1714770.3; 2 pages.
Notification of Reason(s) for Refusal received for Korean Application No. 10-2020-7018773, dated Sep. 23, 2021, 12 pages (6 pages of English Translation and 6 pages of Original Document).
Office Action received for Japanese Patent Application No. 2020-552161, dated Sep. 7, 2021, 4 pages (2 pages of English Translation and 2 pages of Original Document).
Office Action received for Japanese Patent Application No. 2020-552159, dated Sep. 7, 2021, 4 pages (2 pages of English Translation and 2 pages of Original Document).
Office Action received for Korean Patent Application No. 10-2020-7018774, dated Sep. 23, 2021, 10 pages (5 pages of English Translation and 5 pages of Original Document).
Breger et al "High-resolution X-ray diffraction, DIFFaX, NMR and first principles study of disorder in the Li2MnO3—Li[Ni1/2Mn1/2]O2 solid solution", Journal of Solid State Chemistry 178 (2005) 2575-2585.
Jiang et al "Electrochemical and structural study of the layered, "Li-excess" lithium-ion battery electrode material Li[Li1/9Ni1/3Mn5/9]O2", Chem. Mater. 2009, 21, 2733-2745.
Office Action received for Chinese Patent Application No. 201880081413.3, dated Mar. 15, 2022, 17 pages (10 pages of English Translation and 7 pages of Original Document).
Office Action received for Japanese Patent Application No. 2020-552157, dated Jan. 25, 2022, 5 pages (2 pages of English Translation and 3 pages of Original Document).
Park et al., "The Effects of Ni Doping on the Performance of O3-Lithium Manganese Oxide Material", Korean J. Chem. Eng., vol. 21, No. 5, 2004, pp. 983-988.
Kim et al.; "Synthesis and electrochemical behavior of Li[Li0.1Ni0.35-x/2CoxMn0.55-x/2]O2 cathode materials"; Solid State Ionics 164, pp. 43-49. (Year: 2003).
Kim et al.; ("Electrochemical properties of Li[Li(1-x)/3CoxMn(2-2x)/3]O2 (0<x<1) solid solutions prepared by poly-vinyl alcohol method"; Electrochemistry Communications 9, pp. 103-108. (Year: 2007).
Sun et al.; "The preparation and electrochemical performance of solid solutions LiCoO2—Li2MnO3 as cathode materials for lithium ion batteries"; Electrochimica Acta 51, pp. 5581-5586. (Year: 2006).
Thackeray et al. "Li2MnO3-stabilized LiMO2 (M=Mn, Ni, Co) electrodes for lithium-ion batteries"; J. of Materials Chemistry, vol. 17, No. 30, pp. 3053-3272. (Year: 2007).
Xiang et al.; "Understanding the Influence of Composition and Synthesis Temperature on Oxygen Loss, Reversible Capacity, and Electrochemical Behavior of xLi2MnO3 (1-x)LiCoO2 Cathodes in the First Cycle"; J. Phys. Chem. 118, pp. 23553-23558. (Year: 2014).
Jang et al., Electrochemical and Solid-State Letters, 1 (1) 13-16 (1998) (Year: 1998).
Xu et al. English machine translation of CN103066274A. (Year: 2013).
Zhang et al. English machine translation of CN105047898A. (Year: 2015).
Lee et al., "High capacity Li[Li0.2Ni0.2Mn0.6]O2 cathode materials via a carbonate co-precipitation method," Journal of Power Sources, vol. 162, No. 2, Sep. 12, 2006, pp. 1346-1350.
Office Action received for Chinese Patent Application No. 201880081264.0, dated Feb. 7, 2022, 19 pages (11 pages of English Translation and 8 pages of Original Document).
Office Action received for Japanese Patent Application No. 2020-552158, dated Aug. 10, 2022, 8 pages (3 pages of English Translation and 5 pages of Original Document).
Office Action received for Korean Patent Application No. 10-2020-7018911, dated Feb. 14, 2022, 16 pages (8 pages of English Translation and 8 pages of Original Document).
Office Action received for Korean Patent Application No. 10-2020-7018912, dated Aug. 17, 2022, 10 pages (5 pages of English Translation and 5 pages of Original Document).
Office Action received for Korean Patent Application No. 10-2020-7018912, dated Feb. 14, 2022, 16 pages (8 pages of English Translation and 8 pages of Original Document).
Feng-min et al., "Recent Developments on Li-ion Batteries positive materials," Battery Bimonthly, vol. 33, No. 6, Dec. 30, 2003, 3 pages.
Hu et al., "Electric Vehicles 3rd Edition" Section 2 Power Battery, vol. 3, Jan. 31, 2003, 12 pages.
Office Action received for Chinese Patent Application No. 201880081278.2, dated Jan. 26, 2022, 18 pages (10 pages of English Translation and 8 pages of Original Document).
Second Office Action received for Chinese Patent Application No. 201880081278.2, dated Jun. 29, 2022, 20 pages (13 pages of English Translation and 7 pages of Original Document).
Third Office Action received for Chinese Patent Application No. 201880081278.2, dated Oct. 19, 2022, 14 pages (9 pages of English Translation and 5 pages of Original Document).

* cited by examiner

MAGNESIUM SALTS

CROSS-REFERENCE TO RELATED APPLICATIONS

This application is a national stage application under 35 U.S.C. 371 of International Application No. PCT/GB2018/052538, filed Sep. 7, 2018, which claims the priority of United Kingdom Application No. 1714771.1, filed Sep. 14, 2017, the entire contents of each of which are incorporate herein by reference.

FIELD OF THE DISCLOSURE

The present disclosure relates to salts of magnesium. Additionally, the present disclosure relates the use of the magnesium salts as electrolytes in a cell or battery.

BACKGROUND OF THE DISCLOSURE

The drive to increase power densities of rechargeable batteries past those currently accessible in established lithium-ion cells for portable electronics has brought about increased interest in developing multivalent battery systems with superior theoretical energy densities. In particular, considerable research focus has been placed on magnesium-ion cells owing to the high theoretical volumetric energy density of magnesium metal anodes as well as potential safety, cost, and environmental benefits. Lithium-ion cells can also form Li dendrites, which have been found to cause short circuiting and dangerous thermal runaway. Magnesium does not readily form dendrites over multiple charge cycles. Furthermore, magnesium is highly earth-abundant and has a lower costs of production than lithium, and magnesium metal can be used directly as an anode material.

Despite being an attractive alternative to lithium-ion technology, development of magnesium-ion systems continues to be limited by a lack of electrolyte systems that are stable at both the magnesium anode and cathode materials that operate at potentials greater than 3.5 V. Many established magnesium-ion electrolyte systems gradually decompose at the electrode surfaces and result in magnesium-impermeable layers that passivate the electrodes. Additionally, many high-voltage electrolytes (stable to at least 3.4 V) are chloride-containing and are thought to result in the corrosion of common battery components such as stainless steel. Accordingly, new directions in magnesium-ion electrolyte development have focused on the synthesis and use of chloride-free salts.

It has been recognised theoretically that alkaline earth metals such as magnesium could be used as electrolyte solutions in electrochemical cells and batteries. Magnesium is both highly abundant in the Earth's crust and therefore less expensive per ton than other Alkali and Alkaline Earth metals. In addition, magnesium has a higher charge capacity than lithium. Furthermore, in a magnesium-ion cell, magnesium metal can be used as the metal anode without the risk of thermal runaway due to dendrites not forming on the magnesium metal. However, despite this knowledge magnesium has not been widely adopted as an electrolyte or as a material for anodes because of difficulties in forming electrolytes that are easy to handle and manufacture, stable over a wide voltage range, and also compatible with multiple electrodes.

SUMMARY OF THE DISCLOSURE

In some embodiments, the present disclosure provides a salt of the formula:

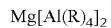

$$Mg[Al(R)_4]_2$$

wherein R represents a halogen-free compound selected from a deprotonated alcohol or thiol; or an amine; or a mixture thereof.

The general formula of the present disclosure defines a set of magnesium aluminate salts which can be made from a common precursor $(Mg(AlH_4)_2)$ without requiring strongly electron withdrawing functional groups on the deprotonated alcohol, thiol or amine, for example halogens. However, the salt could be described more broadly as comprising a deprotonated alcohol, thiol or amine R group which are free of any strongly electron withdrawing groups. Such alcohols, thiols or amines are more readily available and easier to handle for synthesis. Thus, large scale manufacture of the salt of the present disclosure can be more cost effective and simpler than manufacturing of magnesium aluminate salts of the prior art.

The halogen-free alcohol, thiol or amine may be aromatic. Phenoxy groups, or aromatic thiols or amines can provide a salt with improved coordination stability when not provided with halogen groups. In addition, the sterics around the coordination centres (i.e. magnesium and aluminium) can be improved in contrast to using sterically hindered alkyl groups. Specifically, the organic moiety of the halogen-free alcohol, thiol or amine may be based on; iso-propyl, tert-butyl or phenyl. More specifically, R may represent only one halogen-free deprotonated alcohol, for instance phenol, iso-propanol or tert-butanol.

The salt may be crystallised in an organic solvent. The solvated salt gives rise to an electrolyte with improved oxidative stability and good electrochemical performance. Preferably the organic is chloride-free, as chloride-containing solvents are thought to result in the corrosion of common battery components such as stainless steel. Specifically, the organic solvent may be dry DME, 2-methyl-THF, diglyme, triglyme, tetraglyme or THF, since both can improve the electrochemical performance of the resulting electrolyte.

In some embodiments, provided is an electrolyte comprising a salt in accordance with the above Formula (i). The electrolyte may comprise the salt as an additive to a conventional electrolyte, or the salt may be used in a pure solution to form, with an appropriate solvent, an electrolyte by itself. The electrolyte may further comprise an $Mg(PF_6)_2$ additive.

In some embodiments, provided is a cell or battery comprising an electrolyte in accordance with the above Formula (i). The salts of the present disclosure do not suffer from some of the same disadvantages observed with the use of lithium salts in electrochemical cells or batteries. In addition, the salts of the present disclosure can be used in electrolytes in a number of cell or battery systems. More specifically, the cell or battery can be, for example, a lithium cell or a lithium-ion cell. However, the cell or battery using the salts of the present disclosure may be more generally described as a metal based, or a metal-ion based cell or battery. Examples of other metal or metal-ion based cells or batteries may include magnesium, calcium or aluminium metals or ions. When using the salt of the present disclosure in an electrolyte in metal cell or battery, metals such as magnesium, calcium or aluminum may be used as the metal anode without the risk of the salt decomposing.

BRIEF DESCRIPTION OF THE FIGURES

In order that the present disclosure may be more readily understood, an embodiment of the disclosure will now be described, by way of example, with reference to the accompanying Figures, in which.

DETAILED DESCRIPTION OF THE DISCLOSURE

The present disclosure will now be illustrated with reference to the following examples.

Example 1—Synthesis of Mg(AlH$_4$)$_2$ Precursor

A mixture of sodium aluminium hydride from XXX and magnesium chloride from XXX in a ratio of 2:1 was ball-milled for an hour to produce a mixture of magnesium aluminium hydride and sodium chloride at a theoretical 42.5 wt % of magnesium aluminium chloride (scheme below).

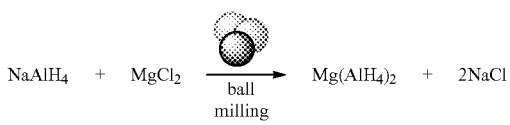

The resulting magnesium aluminium hydride mixture offers a general platform for the synthesis of magnesium aluminates, as will be shown by the following examples.

Example 2—Synthesis of Magnesium Aluminates Using Alcohol

Magnesium aluminates were synthesized by treating magnesium aluminium hydride with various fluorinated/non-fluorinated alkyl and aryl alcohols in dry THF or DME (Scheme below).

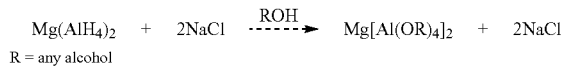

R = any alcohol

These reactions were followed by filtration under inert atmosphere to remove insoluble impurities (i.e. sodium chloride and aluminium-containing by-products). The resulting magnesium aluminates were retrieved, typically as THF or DME solvates, in moderate to high yields (77-94%). The particular alcohols that were used in the synthesis were (1) tert-butanol; and (2) phenol.

Example 3—Characterisation of Magnesium Aluminates

Figure 1:
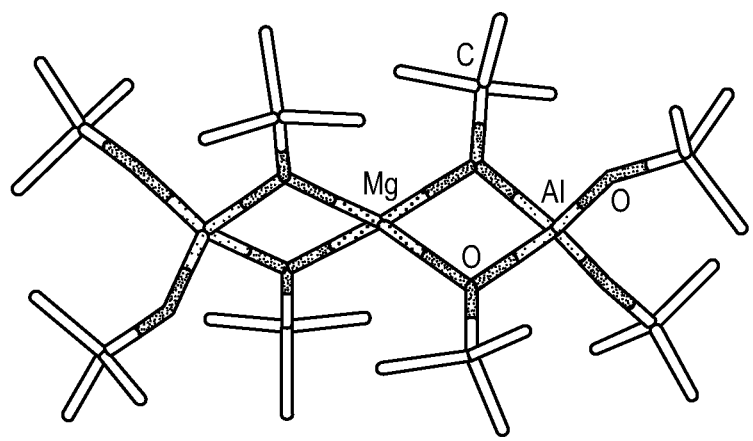
FIG. 1 is an X-ray single crystal structure of a salt, according to some embodiments.
Figure 2:
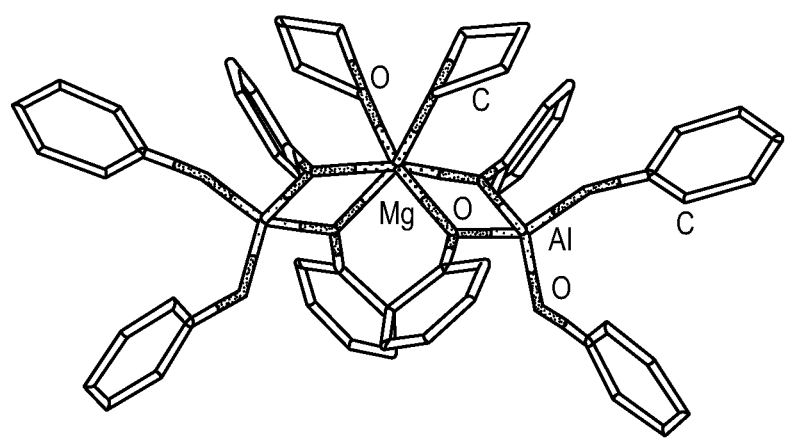
FIG. 2 is an X-ray single crystal structure of a salt, according to some embodiments.
Figure 3:
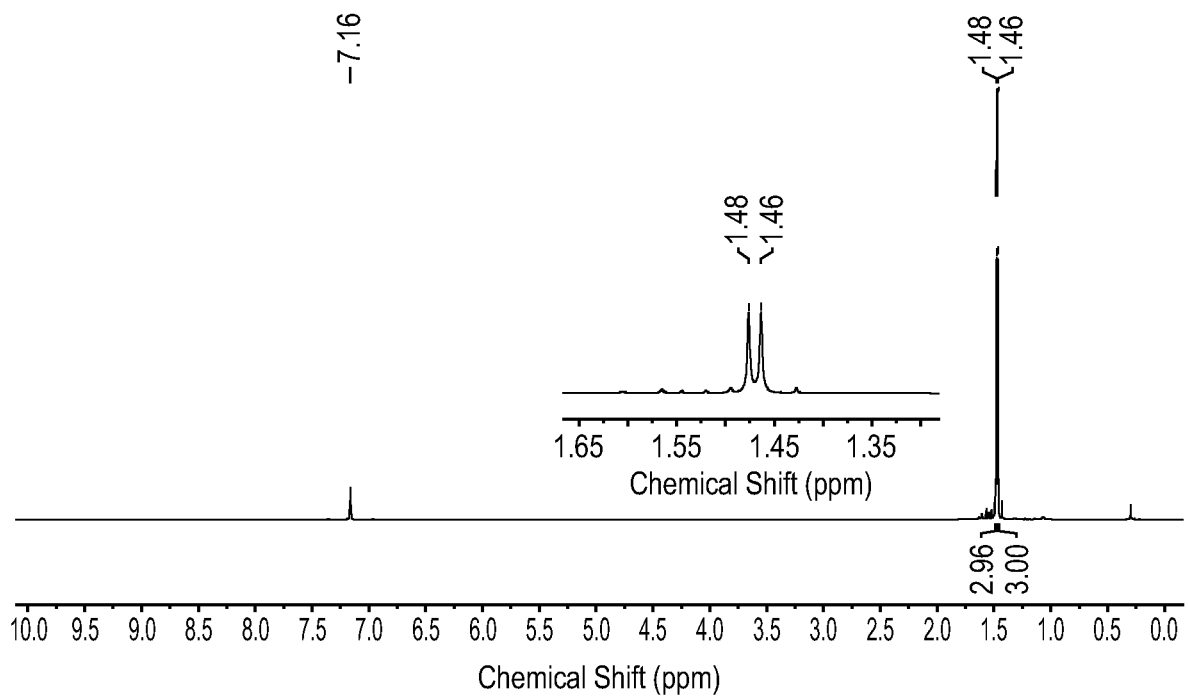
FIG. 3 is a $^1$H NMR spectrum of magnesium tertbutoxyaluminate (1), according to some embodiments.
Figure 4:
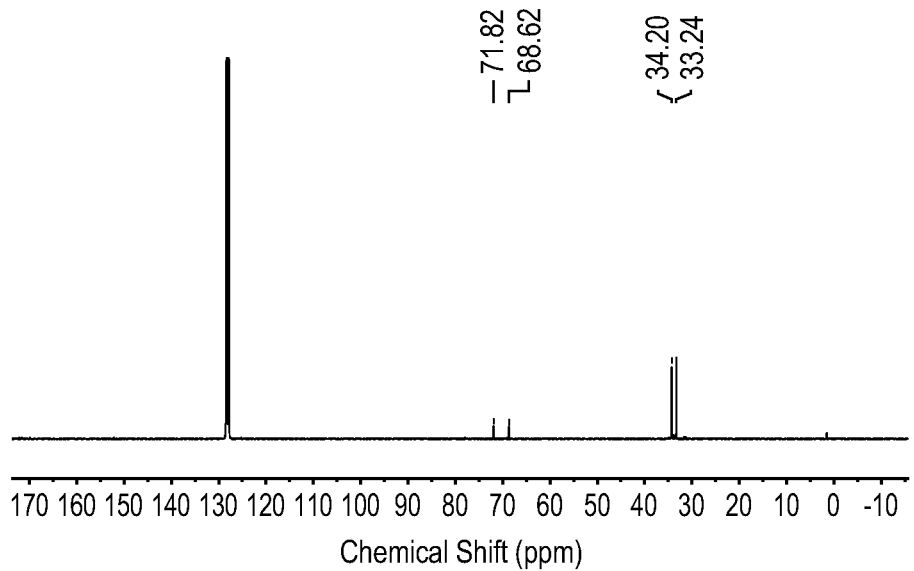
FIG. 4 is a $^{13}$C NMR spectrum of magnesium tertbutoxyaluminate (1), according to some embodiments.
Figure 5:
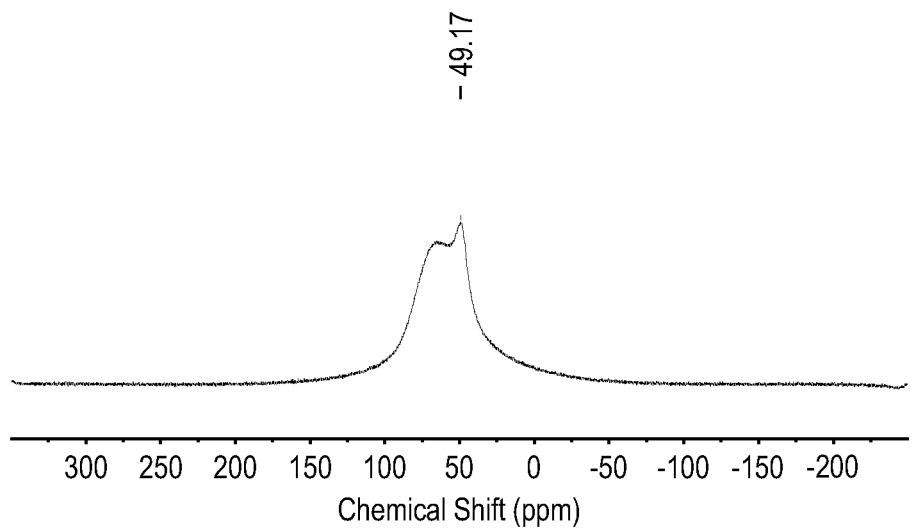
FIG. 5 is a $^{27}$Al NMR spectrum of magnesium tertbutoxyaluminate (1), according to some embodiments.
Figure 6:
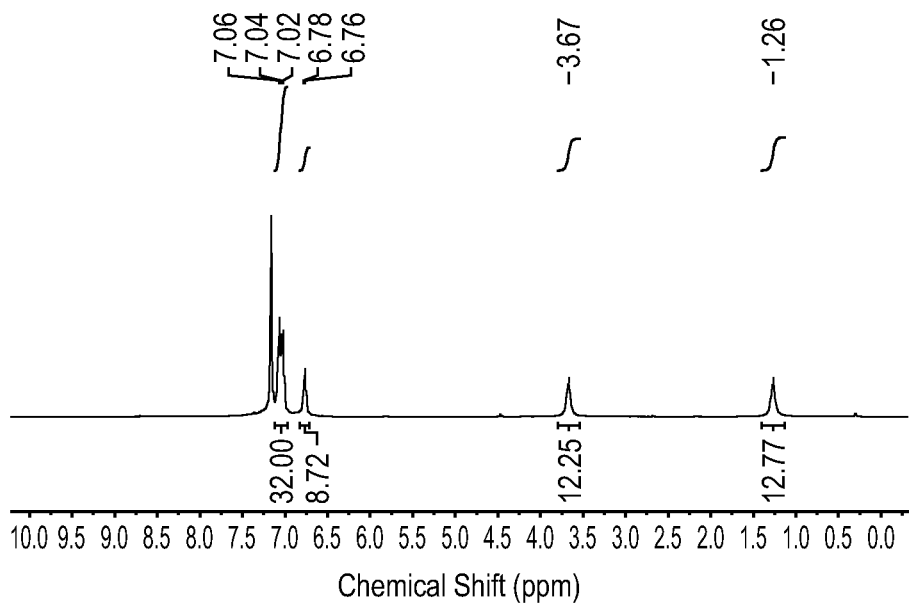
FIG. 6 is a $^1$H NMR spectrum of magnesium phenoxyaluminate (2), according to some embodiments.
Figure 7:
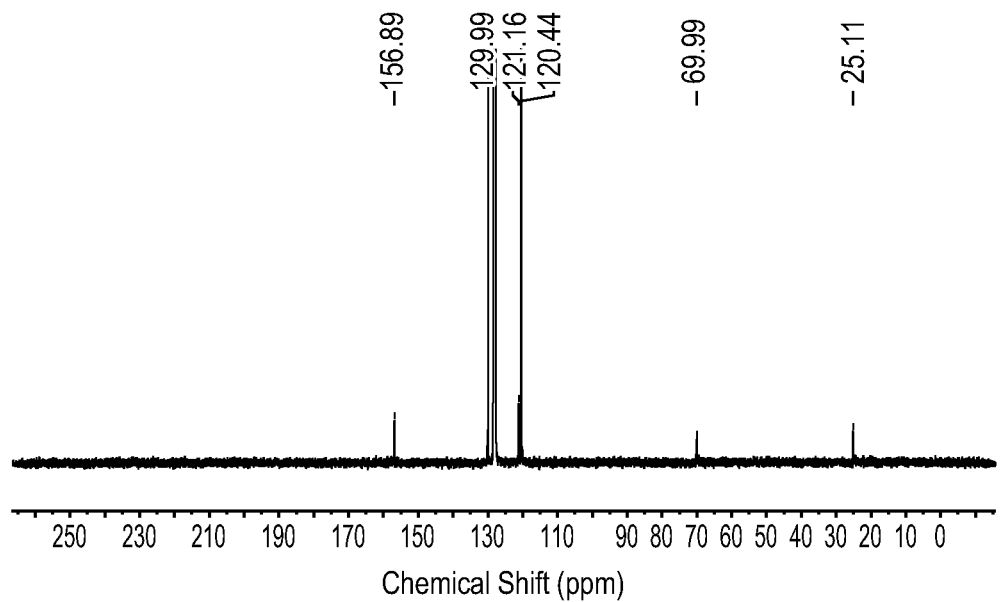
FIG. 7 is a $^{13}$C NMR spectrum of magnesium phenoxyaluminate (2), according to some embodiments.
Figure 8:
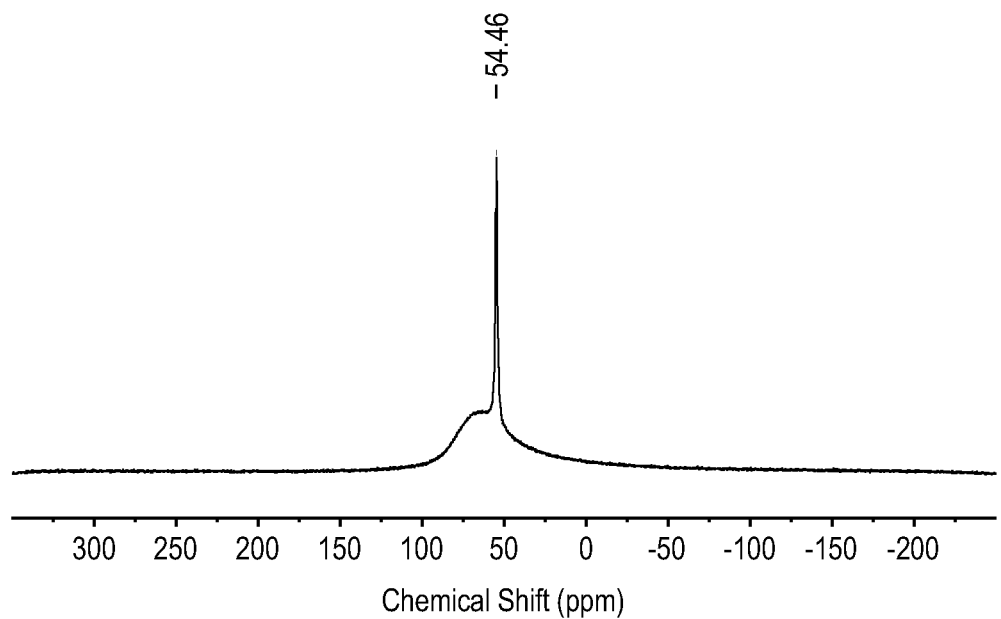
FIG. 8 is a $^{27}$Al NMR spectrum of magnesium phenoxyaluminate (2), according to some embodiments.

A single crystal was obtained from THF containing magnesium tertbutoxyaluminate (1), and magnesium phenoxyaluminate (2), as shown in FIGS. 1 and 2, respectively. X-ray analysis was carried out on data collected with a Bruker D8-Quest PHOTON-100 diffractometer equipped with an Incoatec IμS Cu microsource (λ=1.5418 Å). and confirmed the complex to be the desired salt.

Multinuclear NMR spectra of the powder of the two magnesium aluminates is shown in FIGS. 3 to 8. Magnesium tertbutoxyaluminate (1) exhibits the following NMR signals: $^1$H NMR (C$_6$D$_6$) δ 1.48 (s, 1H), 1.46 (s, 1H) ppm; 13C NMR (C$_6$D$_6$) δ 71.82, 68.62, 34.20, 33.24 ppm; $^{27}$Al NMR (DME) δ 49.17 ppm. Magnesium phenoxyaluminate (2) exhibits the following NMR signals: $^1$H NMR (C$_6$D$_6$) δ 7.08-6.99 (m, 32H), 6.76 (t, J=7.2 Hz, 8H), 3.64 (s, THF), 1.27 (s, THF) ppm; $^{13}$C NMR (C$_6$D$_6$) δ 156.89, 129.99, 121.16, 120.44, 69.99, 25.11 ppm; $^{27}$Al NMR (DME). NMR spectra were recorded at 298.0 K on a Bruker 400 MHz AVIII HD Smart Probe spectrometer CH at 400 MHz, $^{13}$C 101 MHz, $^{27}$Al 104 MHz) unless otherwise specified. Chemical shifts (δ, ppm) are given relative to residual solvent signals for $^1$H and $^{13}$C and to external Al(NO$_3$)$_3$ for $^{27}$Al.

Example 3—Use of Magnesium Aluminates as an Electrolyte Salt

All cyclic voltammetry (CV) and linear sweep voltammetry (LSV) experiments reported below were performed in a glovebox (MBraun) under an atmosphere of dry argon using dry solvents. Cyclic voltammetry and linear sweep voltammetry were performed using an IVIUM CompactStat.

Figure 9:
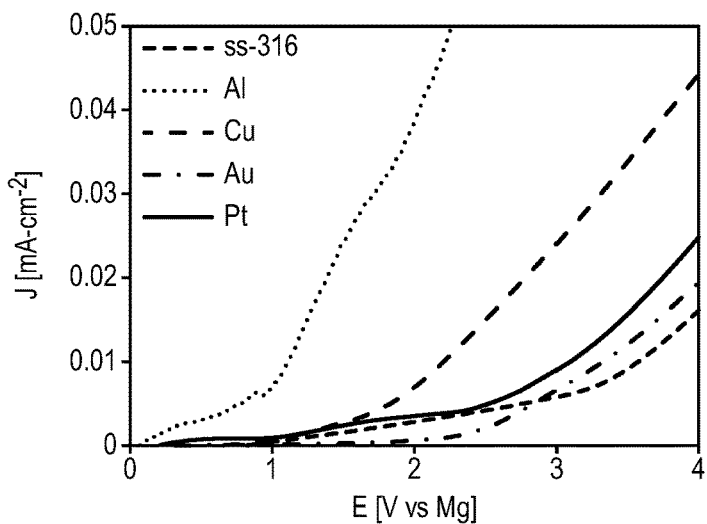
FIG. 9 shows LSV measurements of an electrolyte solution of magnesium tertbutoxyaluminate (1) in THF, according to some embodiments.

A solution of the magnesium aluminates above (1) and (2) in dry organic solvent was prepared at a concentration of 0.25 M. A solution of magnesium tert-butoxyaluminate (1) in THF was found to exhibit poor oxidative stability on stainless steel (ss-316), aluminium, copper, gold, and platinum electrodes, with the onset of oxidation occurring at around 1 V vs magnesium on each electrode, as shown in FIG. 9.

Figure 10:
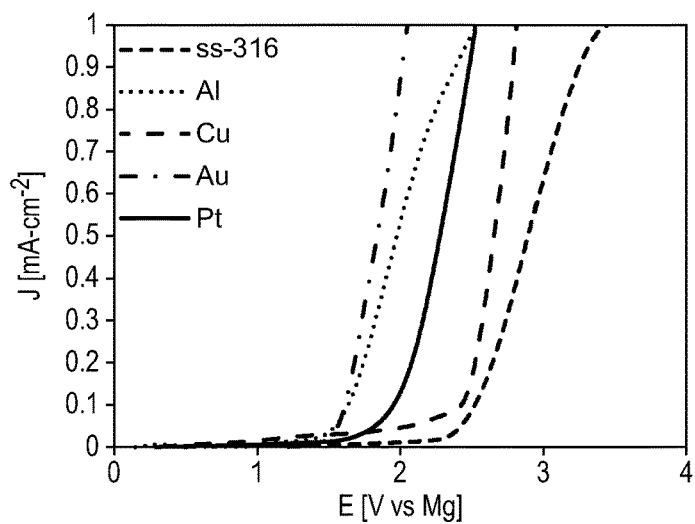
FIG. 10 shows LSV measurements of an electrolyte solution of magnesium phenoxyaluminate (2) in DME, according to some embodiments.

In contrast to magnesium tertbutoxyaluminate (1), a solution of magnesium phenoxyaluminate (2) in DME exhibits moderate oxidative stability with the electrodes that were tested, showing onsets of oxidation between 1.5 V (aluminium, gold and platinum) and 2.2 V ss-316 vs magnesium, as shown in FIG. 10. A minor anodic process beginning around 1 V vs magnesium is observed on copper, followed by a larger process at approximately 2.3 V vs magnesium.

CV was used to examine the ability of these 0.25 M magnesium aluminate solutions to facilitate magnesium plating and stripping using a platinum working electrode.

CV measurements of magnesium aluminate (1) in THF did not show evidence of magnesium plating/stripping behaviour between −0.5 V and 1 V vs Mg.

Figure 11:
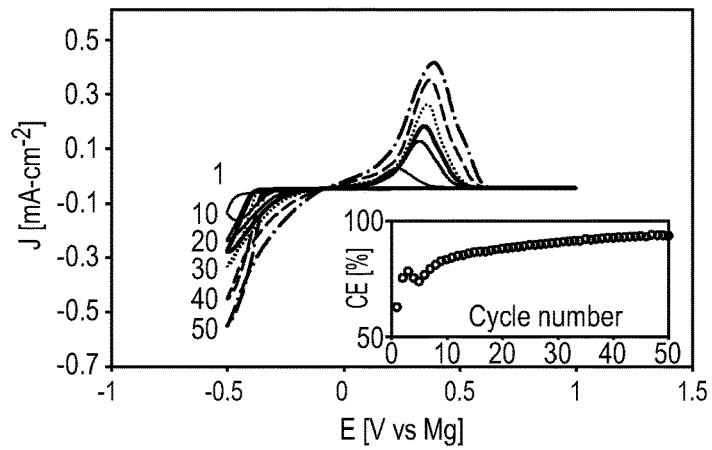
FIG. 11 shows CV measurements of an electrolyte solution of magnesium phenoxyaluminate (2) in DME using a Pt working electrode, according to some embodiments.

CV of magnesium aluminate (2) in DME shows clear plating and stripping behaviour on platinum between −0.5 V and 1 V vs magnesium over 50 voltammetric cycles, as shown in FIG. 11. Plating overpotentials are observed to decrease from −0.41 V to −0.29 V vs magnesium over the 50 cycles.

The electrochemical behaviour of 0.25 M DME solutions of magnesium aluminate (2) was further examined in magnesium full cells constructed using Chevrel phase (Mo6S8) cathodes, magnesium ribbon anodes, and stainless steel current collectors both at room temperature and 55° C.

Figure 12:
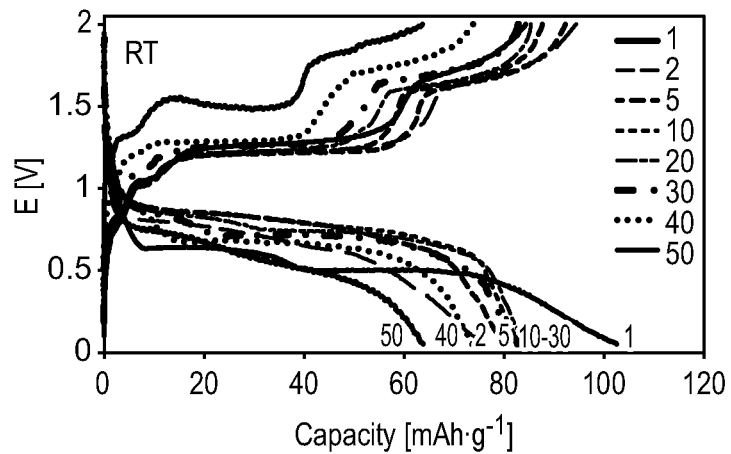
FIG. 12 shows the cycling behaviour of an electrolyte solution of magnesium phenoxyaluminate (2) in DME in a coin cell constructed using a magnesium ribbon anode and a Chevrel phase cathode, cycling at room temperature, according to some embodiments.
Figure 13:
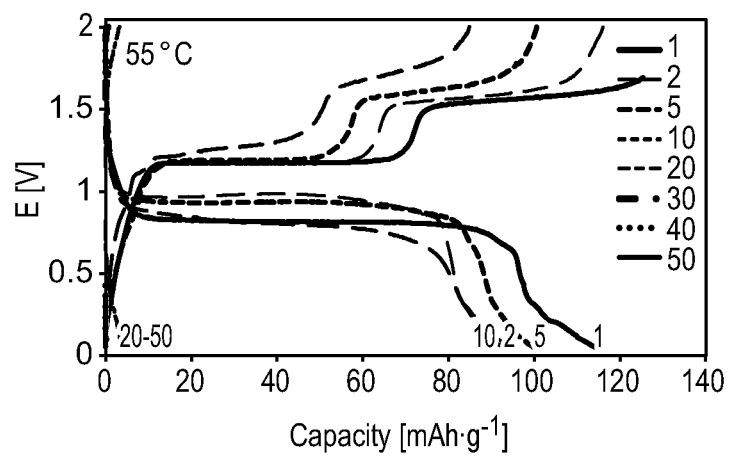
FIG. 13 shows the cycling behaviour of an electrolyte solution of magnesium phenoxyaluminate (2) in DME in a coin cell constructed using a magnesium ribbon anode and a Chevrel phase cathode, cycling at 55° C., according to some embodiments.

Generally, the magnesium aluminate electrolytes exhibited better reversibility, maintained higher capacities over more charge-discharge cycles, and could be cycled at higher rates at 55° C. than at room temperature, as shown in FIGS. 12 and 13. At room temperature, full cells containing magnesium aluminate (2) typically reached a maximum gravimetric capacity of around 80 mAh·g−1 (FIG. 12). However, at 55° C., full cells containing the same electrolytes maintained gravimetric capacities at around 100 mAh·g−1 over 10 charge-discharge cycles with small to moderate overpotentials (FIG. 13).

The invention claimed is:

1. A salt comprising:
    $Mg[Al(R)_4]_2$, wherein R represents a halogen-free compound selected from a deprotonated alcohol, a thiol, an amine, or a mixture thereof;
    wherein one of the halogen-free deprotonated alcohol, thiol, or amine is aromatic; and
    wherein the salt is crystalized from dry DME, diglyme, triglyme, or tetraglyme.

2. The salt of claim 1, wherein the halogen-free deprotonated alcohol, thiol, amine, or mixture thereof is substituted with a tert-butyl or phenyl.

3. The salt of claim 1, wherein R represents the halogen-free aromatic deprotonated alcohol.

4. An electrolyte composition comprising a solvent and comprising the salt of claim 1.

5. The electrolyte composition of claim 4, wherein the electrolyte composition further comprises an $Mg(PF_6)_2$ additive.

6. A cell or battery comprising the electrolyte composition of claim 4.

7. The cell or battery of claim 6, wherein the cell or battery is a magnesium cell or battery or a magnesium-ion cell or battery.

* * * * *